US010300739B1

(12) United States Patent
Saied et al.

(10) Patent No.: US 10,300,739 B1
(45) Date of Patent: May 28, 2019

(54) WHEEL MOUNTED COOLING FAN

(71) Applicants: Jameel Saied, Sun Valley, CA (US); Nos-Hi Saied, Sun Valley, CA (US); Mary Saied, Sun Valley, CA (US)

(72) Inventors: Jameel Saied, Sun Valley, CA (US); Nos-Hi Saied, Sun Valley, CA (US); Mary Saied, Sun Valley, CA (US)

( * ) Notice: Subject to any disclaimer, the term of this patent is extended or adjusted under 35 U.S.C. 154(b) by 0 days.

(21) Appl. No.: 15/928,985

(22) Filed: Mar. 22, 2018

Related U.S. Application Data

(60) Provisional application No. 62/477,675, filed on Mar. 28, 2017.

(51) Int. Cl.
| | |
|---|---|
| *B60B 7/00* | (2006.01) |
| *B60B 19/10* | (2006.01) |
| *B60B 7/02* | (2006.01) |
| *F04D 29/02* | (2006.01) |
| *B60B 11/02* | (2006.01) |
| *B60B 11/06* | (2006.01) |

(52) U.S. Cl.
CPC .............. *B60B 7/0086* (2013.01); *B60B 7/02* (2013.01); *B60B 19/10* (2013.01); *B60B 11/02* (2013.01); *B60B 11/06* (2013.01); *B60B 2900/1216* (2013.01); *B60B 2900/211* (2013.01); *B60B 2900/212* (2013.01); *B60B 2900/513* (2013.01); *F04D 29/023* (2013.01)

(58) Field of Classification Search
CPC ....... B60B 19/10; B60B 11/06; B60B 7/0086; B60B 2900/513; F16D 65/827
USPC ............. 188/264 W, 264 R, 264 A, 264 AA; 301/36.3
See application file for complete search history.

(56) References Cited

U.S. PATENT DOCUMENTS

| | | | | |
|---|---|---|---|---|
| 1,850,588 A * | 3/1932 | Lambert | ............... | F16D 65/827 188/264 R |
| 1,924,060 A * | 8/1933 | Huck | .................... | F16D 65/827 188/264 R |
| 1,929,501 A * | 10/1933 | Lambert | ................. | B60B 11/06 301/13.1 |
| 2,039,554 A * | 5/1936 | Rogers | .................... | B60B 11/06 301/12.1 |
| 2,054,225 A * | 9/1936 | Lewis | ..................... | B60B 11/06 301/36.1 |
| 2,600,410 A * | 6/1952 | Lyon | ....................... | B60B 7/105 188/264 R |

(Continued)

FOREIGN PATENT DOCUMENTS

| | | | | |
|---|---|---|---|---|
| CA | 2115938 A1 * | 8/1995 | ............ | B60B 19/10 |
| CN | 104608751 A * | 5/2015 | | |
| GB | 759048 A * | 10/1956 | ............ | B60B 11/06 |

*Primary Examiner* — Kip T Kotter
(74) *Attorney, Agent, or Firm* — Thomas I. Rozsa

(57) ABSTRACT

A cooling fan mounted on the hub between two tires of a vehicle, especially large tractor trucks and trailers. The wheel mounted cooling fan has a multiplicity of fan blades which extend inwardly and downwardly toward the rim of the interior tire and is mounted between the rims of the inner tire and outer tire with the rear surface of the wheel mounted cooling fan facing the inner tire. The inner fan serves to provide beneficial effect including cooling of the brakes and increasing fuel mileage of the truck. While primarily intended for use with large trucks, the cooling fan can also be sized to fit smaller trucks which have two pairs of wheels in the front and/or the back.

13 Claims, 8 Drawing Sheets

(56) References Cited

U.S. PATENT DOCUMENTS

| | | | | |
|---|---|---|---|---|
| 2,762,469 | A | * | 9/1956 | Lyon ........................ B60B 7/00 |
| | | | | 188/264 W |
| 2,857,023 | A | | 10/1958 | Lyon |
| 2,940,794 | A | | 6/1960 | Murphy et al. |
| 2,945,567 | A | | 7/1960 | Lyon |
| 3,168,348 | A | * | 2/1965 | Fleming ................ B60B 7/0086 |
| | | | | 301/13.1 |
| 3,408,111 | A | * | 10/1968 | Foote ..................... B60B 11/06 |
| | | | | 301/13.1 |
| 4,135,764 | A | * | 1/1979 | Johnson .................. B60B 19/10 |
| | | | | 188/264 AA |
| 4,950,035 | A | * | 8/1990 | Villarreal ................ B60B 19/10 |
| | | | | 188/264 AA |
| 5,271,665 | A | * | 12/1993 | O'Coin ................... B60B 11/06 |
| | | | | 301/36.3 |
| 5,324,099 | A | | 6/1994 | Fitzhugh |
| 5,373,919 | A | * | 12/1994 | Siegrist .................. F16D 53/00 |
| | | | | 188/250 G |
| 6,698,557 | B2 | | 3/2004 | Hayes et al. |
| D505,103 | S | | 5/2005 | Bentley |

\* cited by examiner

WHEEL MOUNTED COOLING FAN

CROSS-REFERENCE TO RELATED APPLICATION

This patent application claims priority to Provisional Application Ser. No. 62/477,675 filed on Mar. 28, 2017.

BACKGROUND OF THE INVENTION

1. Field of the Invention

The present invention relates to the field of brake fans used on the wheels of trucks.

2. Description of the Prior Art

The following eight patents are the most relevant known to the inventors at this time:
1. U.S. Pat. No. 2,762,469 issued to George Albert Lyon on Sep. 11, 1956 for "Wheel Cover" (hereafter the "'469 Lyon Patent");
2. U.S. Pat. No. 2,857,023 issued to George Albert Lyon on Oct. 21, 1958 for "Wheel Cover" (hereafter the "'023 Lyon Patent");
3. U.S. Pat. No. 2,940,794 issued to John H. Murphy et al. on Jun. 14, 1960 for "Vehicular Wheel" (hereafter the "Murphy Patent");
4. U.S. Pat. No. 2,945,567 issued to George Albert Lyon on Jul. 19, 1960 for "Wheel Structure with Brake Drum Cooling Means" (hereafter the "'567 Lyon Patent");
5. U.S. Pat. No. 3,168,348 issued to James E. Fleming et al. on Feb. 2, 1965 for "Wheel Cooling Means" (hereafter the "Fleming Patent");
6. U.S. Pat. No. 5,324,099 issued to Lloyd B. Fitzhugh on Jun. 28, 1994 for "Vehicle Spray Suppression Apparatus" (hereafter the "Fitzhugh Patent");
7. U.S. Pat. No. 6,698,557 issued to Brian D. Hayes et al. on Mar. 2, 2004 for "Brake Drum Cooling Apparatus" (hereafter the "Hayes Patent");
8. U.S. Design Pat. No. D505,103 issued to James Bentley on May 17, 2005 for "Airplane Tire Fin" (hereafter the "Bentley Design Patent").

3. Analysis of Prior Art

The '469 Lyon Patent relates to improvements in wheel structures and more particularly concerns the provision of novel ornamental means for the outer sides of vehicle wheels. This patent discloses an improved wheel structure wherein a cover for the outer side of the wheel is equipped with air circulation promoting means. The wheel cover is affixed to the wheel rim.

The '023 Lyon Patent discloses a wheel structure wherein a cover for the outer side of the wheel serves as an air circulation promoting structure. This patent was a continuation of the prior '469 Lyon Patent.

The shape of the fan blades disclosed in the present invention are clearly different than those disclosed in the '023 Lyon Patent.

The Murphy Patent discloses an improvement over prior wheel fans by allowing the brake drum to expand and contract. The fan blades extend directly from the brake drum and are not a separate removable piece.

The '567 Lyon Patent discloses a brake drum cooling device. This patent discloses a plurality of circumferentially spaced struck-out air louvers capable of directing air into the gap between the rim and the brake drum to cool the brake drum.

The Fleming Patent discloses a fan mount. The fan preferably comprises any desired number of blades. The fan directs all of the air flow axially of the fan. The type of fan and the shape used in the Flaming Patent are similar to that of a traditional fan (having approximately 3 large blades).

The Fitzhugh Patent relates to devices for suppressing the water spray thrown by vehicle tires. The Fitzhugh Patent discloses an apparatus that generates air flow for blocking outward movement of the water spray. Air turbines are attached to the outboard sides of each tire on the vehicle. The air turbines, being rigidly affixed to the hub of each wheel, rotate with the wheels and by means of angled vanes disposed in each air turbine generate a flow of air outwardly and perpendicular to the axle. This radial flow suppresses the water spray outboard of each wheel.

The Hayes Patent discloses a brake drum assembly including an impeller and stator that help cool the brake drum. The impeller and stator combination are especially suited for low-speed vehicle operations. The impeller includes a plurality of impeller vanes formed about the circumference of the impeller that draws cool air across the brake drum. The impeller is mounted to an external surface of the brake drum for rotation with the drum about an axis of rotation. The stator is held fixed with respect to the drum and includes a first portion that forms a circular band, which is positioned in an overlapping relationship to the impeller, and a second portion that is transverse to the first portion. The second portion extends radially inwardly toward the axis of rotation to form a vertical face. A plurality of stator vanes are formed within the vertical face that direct the airflow away from the brake drum toward an inboard direction that is generally parallel to the axis of rotation.

The Bentley Design Patent is a design for an airplane tire fan.

SUMMARY OF THE INVENTION

The present invention relates is a cooling fan mounted on the hub between two tires of a vehicle, especially large tractor trucks and trailers. The wheel mounted cooling fan has a multiplicity of fan blades which extend inwardly and downwardly toward the rim of the interior tire and is mounted between the rims of the inner tire and outer tire with the rear surface of the wheel mounted cooling fan facing the inner tire. The inner fan serves to provide beneficial effect including cooling of the brakes and increasing fuel mileage of the truck. While primarily intended for use with large trucks, the cooling fan can also be sized to fit smaller trucks which have two pairs of wheels in the front and/or the back.

An object of the present invention wheel mounted fan is to provide a fan that is placed between wheels in the location of the hub to be mounted on trucks and trailers. The wheel mounted fan provides numerous benefits to the operation of the truck by cooling the brakes, hubs, and tires while the truck is in motion.

The present invention is intended for use in vehicles which have two sets of tires adjacent each other running on the same axle with the present invention wheel mounted cooling fan affixed to the hub of the axle and positioned between the outer portion of the rim of the inner tire and the inner portion of the rim of the outer tire with the fan blades extending radially inward towards the inner tire. The present invention cooling fan is therefore mounted to the hub of a side of an axle containing two tires with the present invention cooling fan located between the inner wheel and the outer wheel.

A further object of the present invention improved wheel mounted fan is to have a circumferential base with a multiplicity of triangular shaped blades that extend perpendicularly from the circumferential base of the improved wheel mounted fan to the edge of the rim of the truck tire when mounted.

A further object of the present invention is to provide a non-obvious shape of the blade for the most efficient cooling of tires and brakes.

It is also an object of the present invention to provide a wheel mounted fan that has individual blades that are predominantly shaped as isosceles triangles with chamfered corners. The lengths of the sides of each of the triangles is approximately 3.5 inches and the corners of the triangle edges are filleted or arcuate. One way to describe the orientation of the blades is; the blades themselves extend radially inward towards the inner tire when the wheel mounted fan is in place between an inner tire and an adjacent outer tire.

It is also an object of the present invention to provide a wheel mounted fan with spaced apart blades that are approximately 3 inches apart. Each of the blades has a blade thickness of approximately 0.09 inches.

Yet another object of the present invention is to provide a wheel mounted fan that easily attaches to the hub or bolts on to a rim of a truck tire by the affixing of ten (10) equally spaced apart lug nuts through holes that are located in the circumferential base of the wheel mounted fan. This allows the improved wheel mounted fan to easily affix to the rim of standard truck tires.

It is a further object of the present invention to provide a wheel mounted fan that aids in the removal of snow and ice from the tire while a truck is traveling through snow covered roads. This feature adds increased safety since hardened ice within the wheel frame can pierce a tire causing a flat.

It is a further object of the present invention to provide a wheel mounted fan designed to displace air from under the vehicle through the inner wheel and out between the two wheels. The unique shape and location of the blades provides the improved benefits of 1) cooling brakes and hubs which reduce wear and tear; 2) reducing under vehicle temperature; 3) reducing aerodynamic drag and reducing air pressure under the vehicle; 4) increasing fuel economy; and 5) reducing snow pack.

It is a further object of the present invention to provide a wheel mounted fan design to displace the hot air generated under the vehicle. This hot air can be formed from a phenomenon known as hot air packing. Hot air packs can form under the vehicle near the locations of the axles. These hot air packs can grow in size and move forward towards the radiator. This can then cause the radiator to heat up which will cause the clutch fan to run more which will increase fuel cost. The centrifugal force created by the present invention fan pulls hot air away from the brakes and tires to provide a cooling effect while simultaneously decreasing the pressure under the vehicle to reduce drag.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1A:
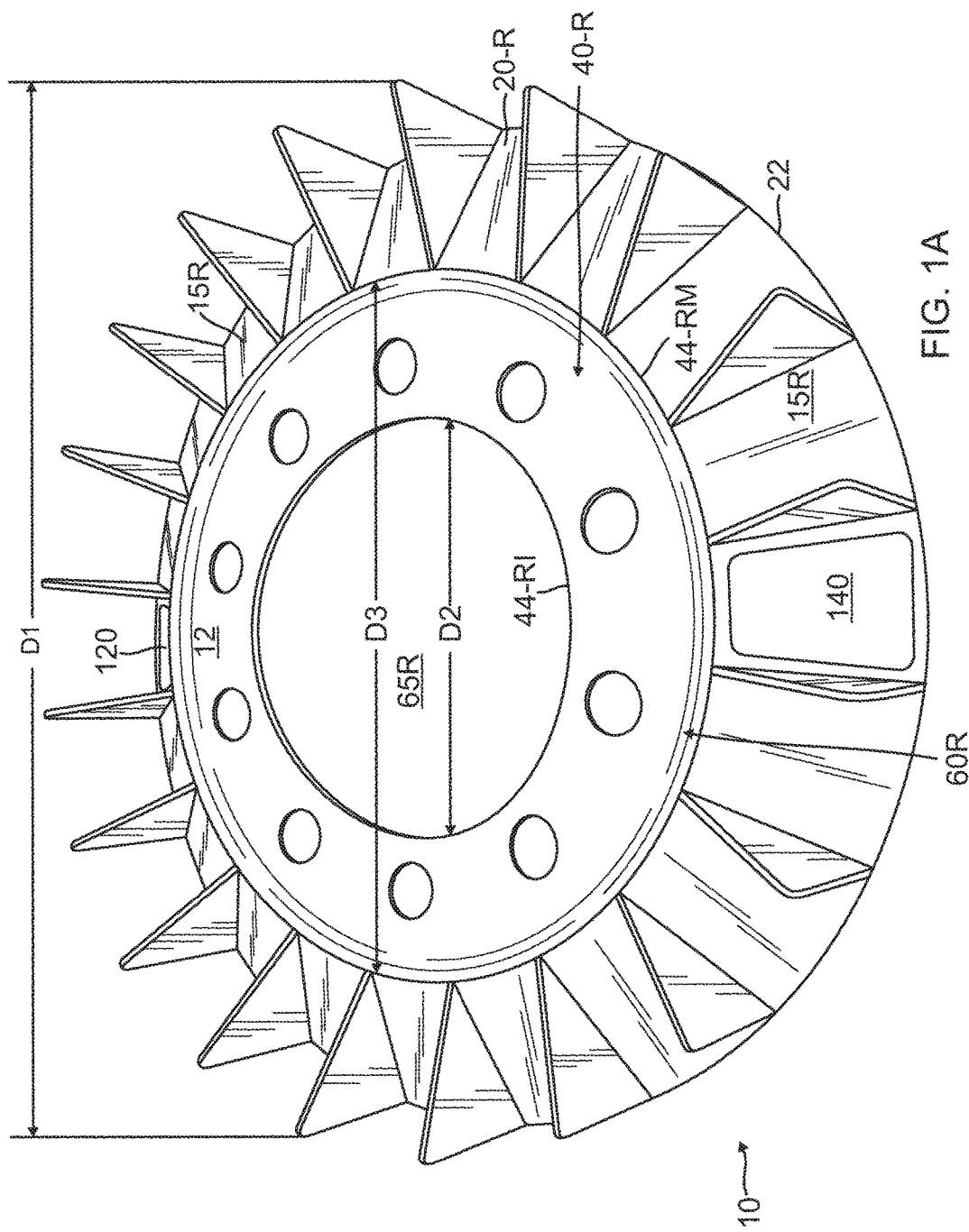
FIG. 1A is a rear perspective view of the present invention improved wheel mounted fan with the fan positioned on a horizontal surface but described in its operative condition in the detailed description of the preferred embodiment.
Figure 1B:
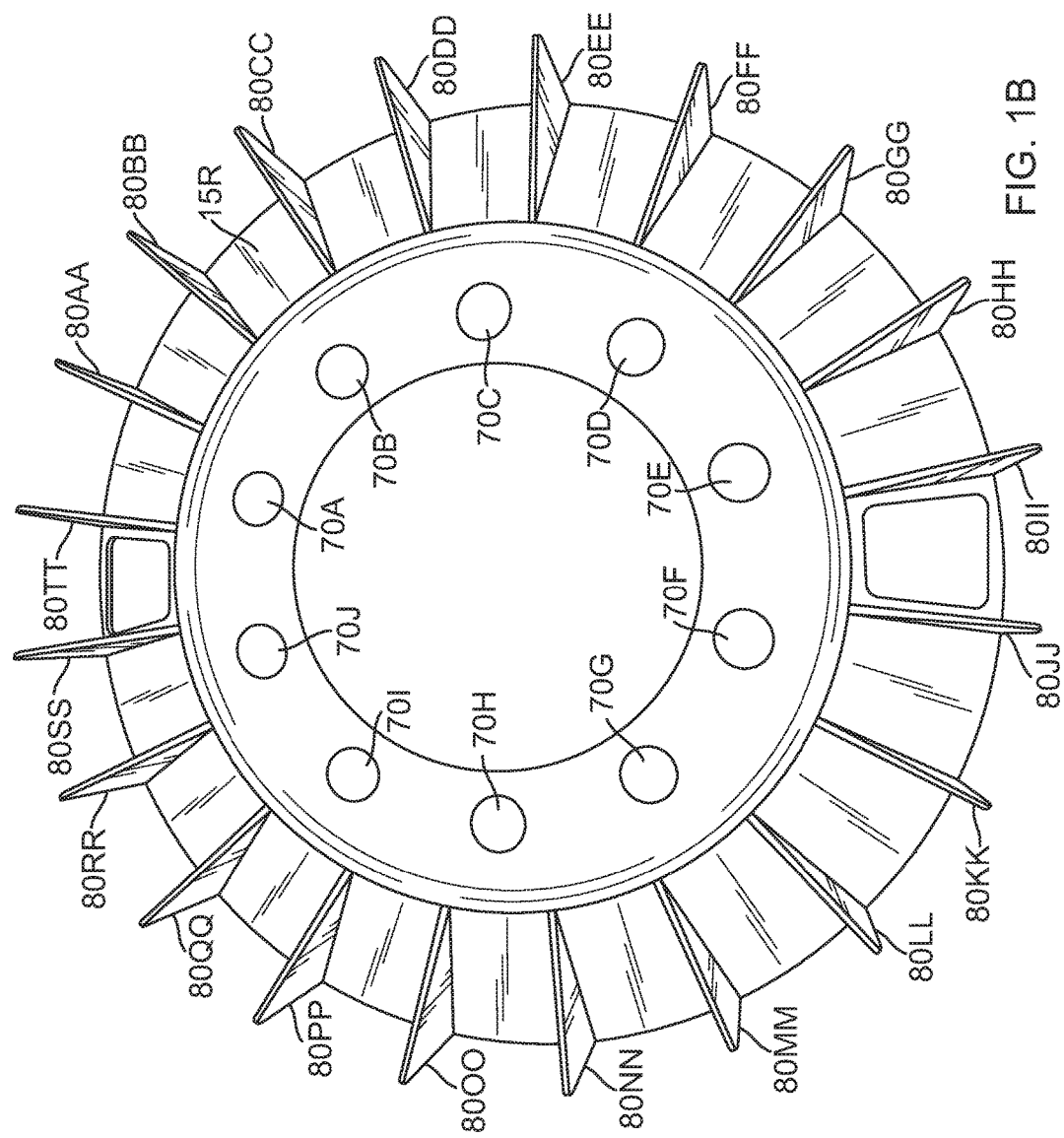
FIG. 1B is a rear plan view of the present invention improved wheel mounted fan with the fan positioned on a horizontal surface but described in its operative condition in the detailed description of the preferred embodiment.

Referring to FIG. 1A, there is illustrated is a rear perspective view of the present invention improved wheel mounted fan with the fan positioned on a horizontal surface but described in its operative condition. Referring to FIG. 1B, there is illustrated a rear plan view of the present invention improved wheel mounted fan with the fan positioned on a horizontal surface but described in its operative condition. The two views are provided to facilitate adequate space so as to clearly reference each part.

Figure 2A:
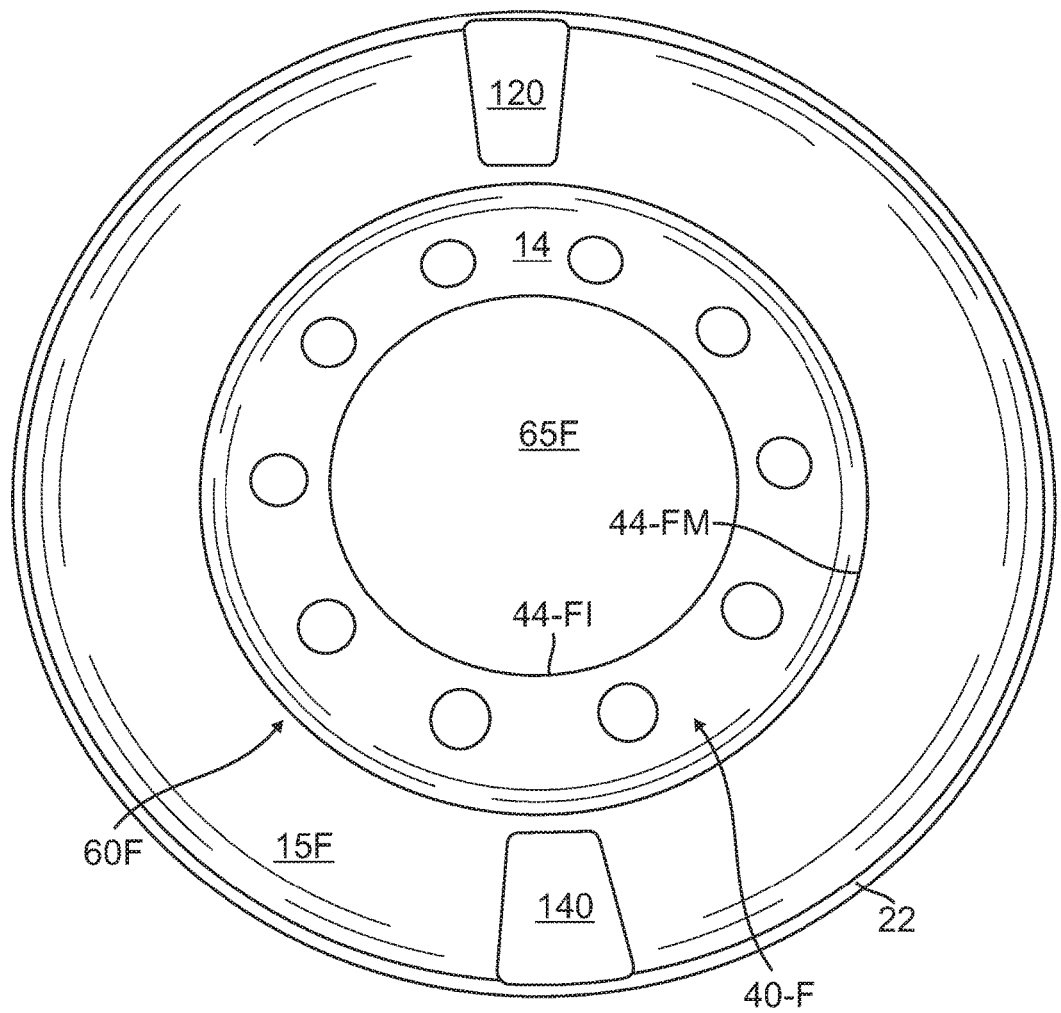
FIG. 2A is a front perspective view of the present invention improved wheel mounted fan with the fan positioned on a horizontal surface but described in its operative condition in the detailed description of the preferred embodiment.
Figure 2B:
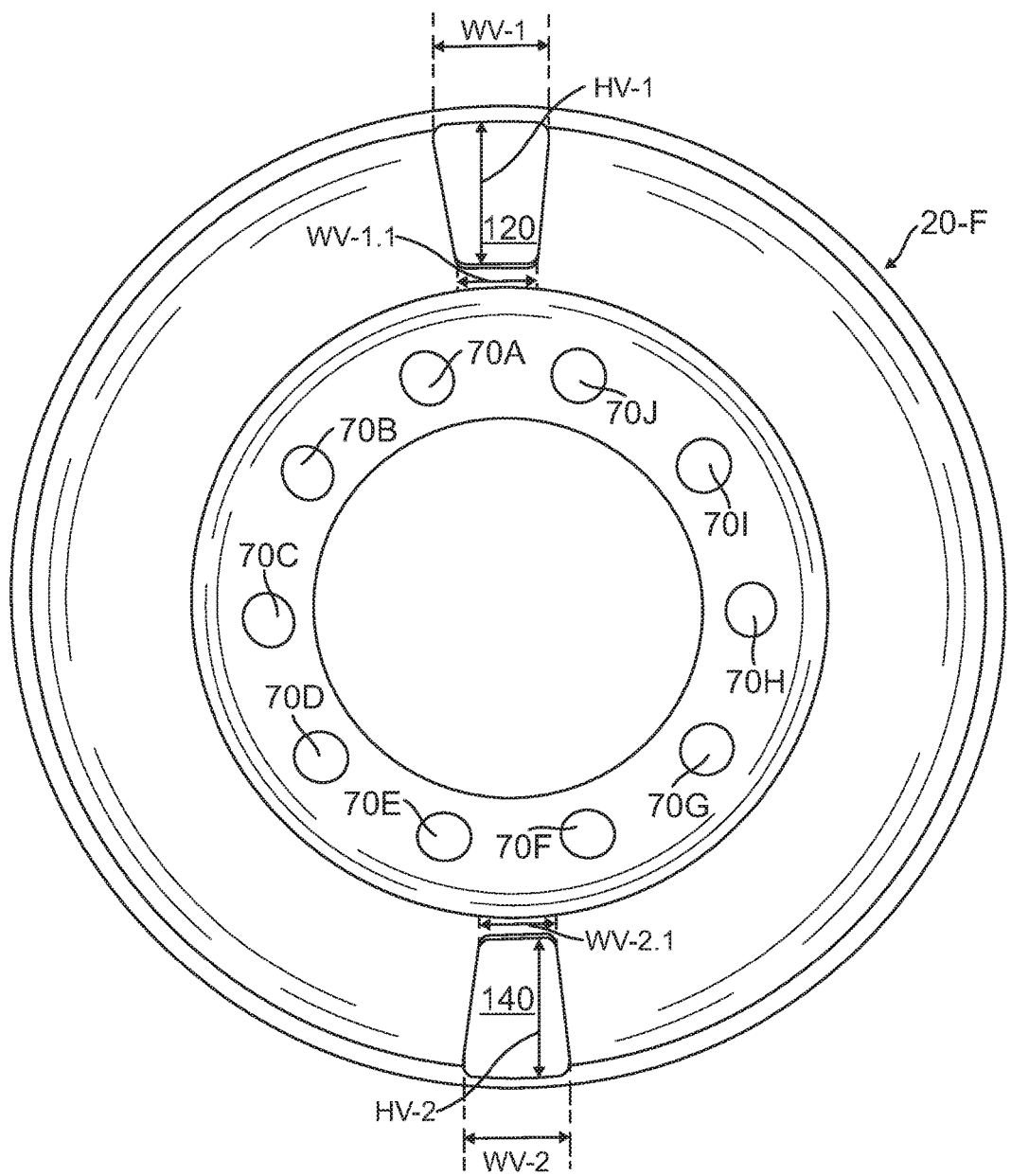
FIG. 2B is a front plan view of the present invention improved wheel mounted fan with the fan positioned on a horizontal surface but described in its operative condition in the detailed description of the preferred embodiment.

Referring to FIG. 2A, there is illustrated a front perspective view of the present invention improved wheel mounted fan with the fan positioned on a horizontal surface but described in its operative condition. Referring to FIG. 2B, there is illustrated a front plan view of the present invention improved wheel mounted fan with the fan positioned on a horizontal surface but described in its operative condition. The two views are provided to facilitate adequate space so as to clearly reference each part.

Referring to FIGS. 1A, 1B, 2A and 2B, there is illustrated the present invention improved wheel mounted cooling fan 10, having a rear surface 12, a front surface 14, an outer rear circumferential section 20-R, an outer front circumferential section 20-F, a rear inner circumferential section 40-R, and a front inner circumferential section 40-F. Outer rear circumferential section 20-R and outer front circumferential section 20-F meet at an outer circumferential edge 22. Rear inner circumferential section 40-R has a middle circumferential edge 44-RM and an inner circumferential edge 44-RI. The transition from circumferential edge 44-RM and an inner circumferential edge 44-RI. The transition from outer circumferential edge 22 to connect with middle circumferential edge 44-RI occurs along rear circumferential angled surface 15R. When in place between two tires, rear circumferential angled surface 15R transitions inward and downward at an angle of approximately 28.7 degrees from outer circumferential edge 22 to connect at middle circumferential edge 44-RM. Collectively, the structure between outer circumferential edge 22 and inner circumferential edge 44-RI form rear circumferential base 60R of the wheel mounted cooling fan 10 with rear circumferential base 60R having a central opening 65R that allows the present invention wheel mounted cooling fan 10 to be positioned over the wheel hub of an inner wheel of a truck axle.

Front inner circumferential section 40-F has a middle circumferential edge 44-FM and an inner circumferential edge 44-FL The transition from outer circumferential edge 22 to connect with middle circumferential edge 44-FI occurs along front circumferential angled surface 15F. Front circumferential angled surface 15F transitions inward and downward at an angle of approximately 28.7 degrees from outer circumferential edge 22 to connect at middle circumferential edge 44-FM. Collectively, the structure between outer circumferential edge 22 and inner circumferential edge 44-FI form front circumferential base 60F of the wheel mounted cooling fan 10 with front circumferential base 60F having a central opening 65F that allows the present invention wheel mounted cooling fan 10 to be positioned over the wheel hub of an outer wheel of a truck axle.

Located between front circumferential angled surface 15F and rear circumferential angled surface 15R are two oppositely disposed valve openings 120 and 140. Valve openings 120 and 140 are to accommodate a valve located from either a valve extending outwardly from the inner tire or a valve extending inwardly from the outer tire. Using FIG. 2B, the dimensions of valve opening 120 include an exterior width "WV-1" and an interior width "WV-1.1" which will vary from 2.436 inches to 1.806 inches and a middle radial height "HV-1" which is preferably 3.127 inches. Similarly, the dimensions of valve opening 140 include an exterior width "WV-2" and an interior width "WV-2.1" which will vary from 2.436 inches to 1.806 inches and a middle radial height "HV-2" which is preferably 3.127 inches" Preferably, each respective valve opening 120 and 140 is the same shape which by way of example is an outline of a frustum with the outer edge adjacent exterior circumferential edge 22 wider than the inner edge adjacent rear middle circumferential edge 44-RM and front middle circumferential edge 44-FM. The valve openings 120 and 140 are to accommodate a valve extending outwardly from the inner tire or a valve extending outwardly from the outer tire. These values are typical and could be larger or smaller.

Referring to FIGS. 1B and 2B, there is shown the present invention improved wheel mounted cooling fan 10, having ten mounting holes (70A, 70B, 70C, 70D, 70E, 70F, 70G, 70H, 70I and 70J). These mounting holes are used to easily mount and affix the present invention improved wheel mounted cooling fan 10 to the rim of an inner wheel of a truck tire and also to the rim of an outer wheel of a truck tire. The diameter of each of the mounting holes is approximately 1.2 inches.

Referring once again to FIG. 1B, there is shown the present invention improved wheel mounted cooling fan 10, having a multitude of blades (20 blades labeled 80AA, 80BB, 80CC, 80DD, 80EE, 80FF, 80GG, 80HH, 8011, 80JJ, 80KK, 80LL, 80MM, 80NN, 8900, 80PP, 80QQ, 80RR, 80SS and 80TT) that extend radially from rear circumferential angled surface 15R. These blades and their shape comprise a unique feature of this invention which is an improvement over the prior art to allow a better cooling system. It is within the spirit and scope of this invention for the number of blades to be between ten (10) and forty (40).

Figure 3:
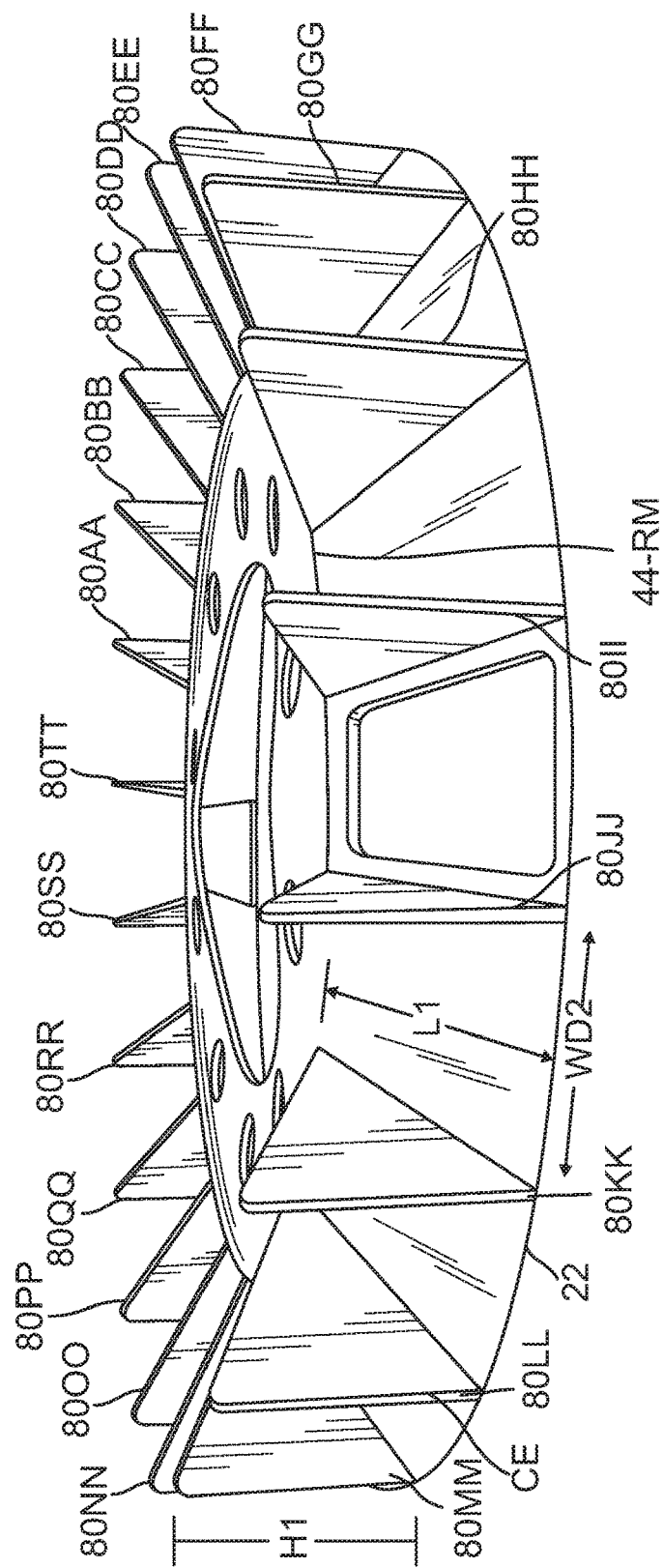
FIG. 3 is a rear/side perspective view of the present invention improved wheel mounted fan.
Figure 4:
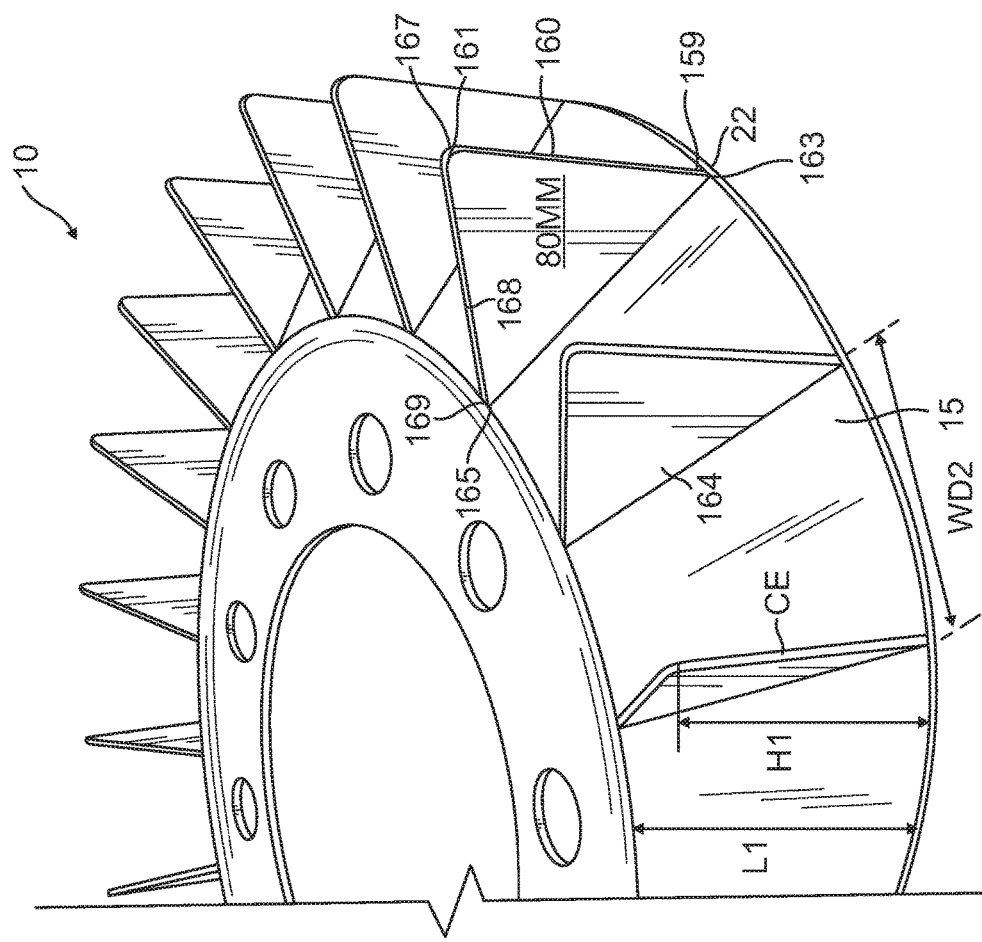
FIG. 4 is an enlarged view of a portion of FIG. 3.

Referring to FIG. 3, there is illustrated a rear/side perspective view of the present invention improved wheel mounted fan 10. FIG. 4 is an enlarged portion of FIG. 3. FIG. 4 is used to create sufficient space on a fan blades to clearly mark the components of at least one fan blade.

Referring to FIGS. 1A and 3, there is shown the present invention improved wheel mounted cooling fan 10, having an overall diameter D1 between outer circumferential section edges 22 of approximately 21.625 inches. Also illustrated is the central opening 65R having a diameter D2 of approximately 9 inches. Located in between central opening 65R and outer circumferential section edge 22 is rear middle circumferential edge 44-RM. The diameter D3 of the present invention improved wheel mounted cooling fan 10 at middle circumferential edge 44-RM is approximately 15 inches.

Referring to FIG. 4, each fan blade is preferably identical using fan blade 80HH as an example, each fan blade has a pair of legs 164 and 168 and a base 160. In a preferred embodiment, each of the multiplicity of fan blades is in the general shape of an isosceles triangle with a first leg 164 of the isosceles triangle integrally formed with the rear inner circumferential angled surface 15R and extending from a proximal end 163 adjacent the outer circumferential edge 22 to a first distal end 165 adjacent the rear middle circumferential edge 44-RM. A base 160 extends from its bottom end 159 adjacent the outer circumferential edge 22 and formed with the proximal end 163 of first leg 164 to a second distal end 161 and the second leg of the isosceles triangle 168 extends from its proximal end 167 which is joined with second distal end 161 of the base 160 to a third distal end 169 adjacent rear middle circumferential edge 44-RM and the third distal end 169 joined to the first distal end 165 of first leg 164. Therefore, the following sets of distances join at approximately the same location: 159 and 163; 161 and 167; and 165 and 169.

Referring again to FIG. 3, there is illustrated the dimensions of a respective one (1) of the twenty (20) fan blades 80AA to 80TT that extend radially from the rear circumferential angled surface 15R. These blades and their shape comprise a unique feature of this invention which is an improvement over the prior art to allow a better cooling system circumferential base of the present invention improved wheel mounted cooling fan 10. It is the intent of the present invention for all of the fan blades to have the same dimensions. The dimensions provided are a preferred dimension. It will be appreciated that the fan blades are not limited to the preferred dimensions set forth in this paragraph. Referring to FIG. 4, each fan blade has a triangle shape with each rounded base 160 having a height H1 defined as the perpendicular distance from rear circumferential angled edge 22 at proximal end 159 to second distal end 161. Height H1 is typically equal to 3.029 inches but could be smaller or larger. Also illustrated in FIGS. 3 and 4 is the chamfered edge of second distal end 161 having a chamfered edge CE with a radius of 0.188 inches. Triangle edges 164 and 168 also have chamfered edges of 0.188 inches. Each fan blade has a top thickness at triangle peak 161 of 0.094 inches. The thickness of the fan blade at the bottom edge where the triangle connects to rear outer circumferential angled surface 15R is slightly thicker or approximately 0.15 inches. It is within the spirit and scope of this invention for the blades to have triangular shapes that are equilateral or isosceles. It is also within the spirit and scope of this invention for the triangle blades to be larger or smaller than the dimensions specified above.

Referring to FIG. 4, numerous shaped blades and blade locations were tested during the design of the present invention wheel mounted cooling fan 10. Distance L1 is the distance from the rear middle circumferential edge 42-RM to outer circumferential section edge 22. Distance WD2 is the outer circumferential distance between individual blades. For increased air flow caused by the centrifugal force when the present invention wheel mounted cooling fan 10 is in motion, distance L1 should be greater than distance WD2.

Figure 6:
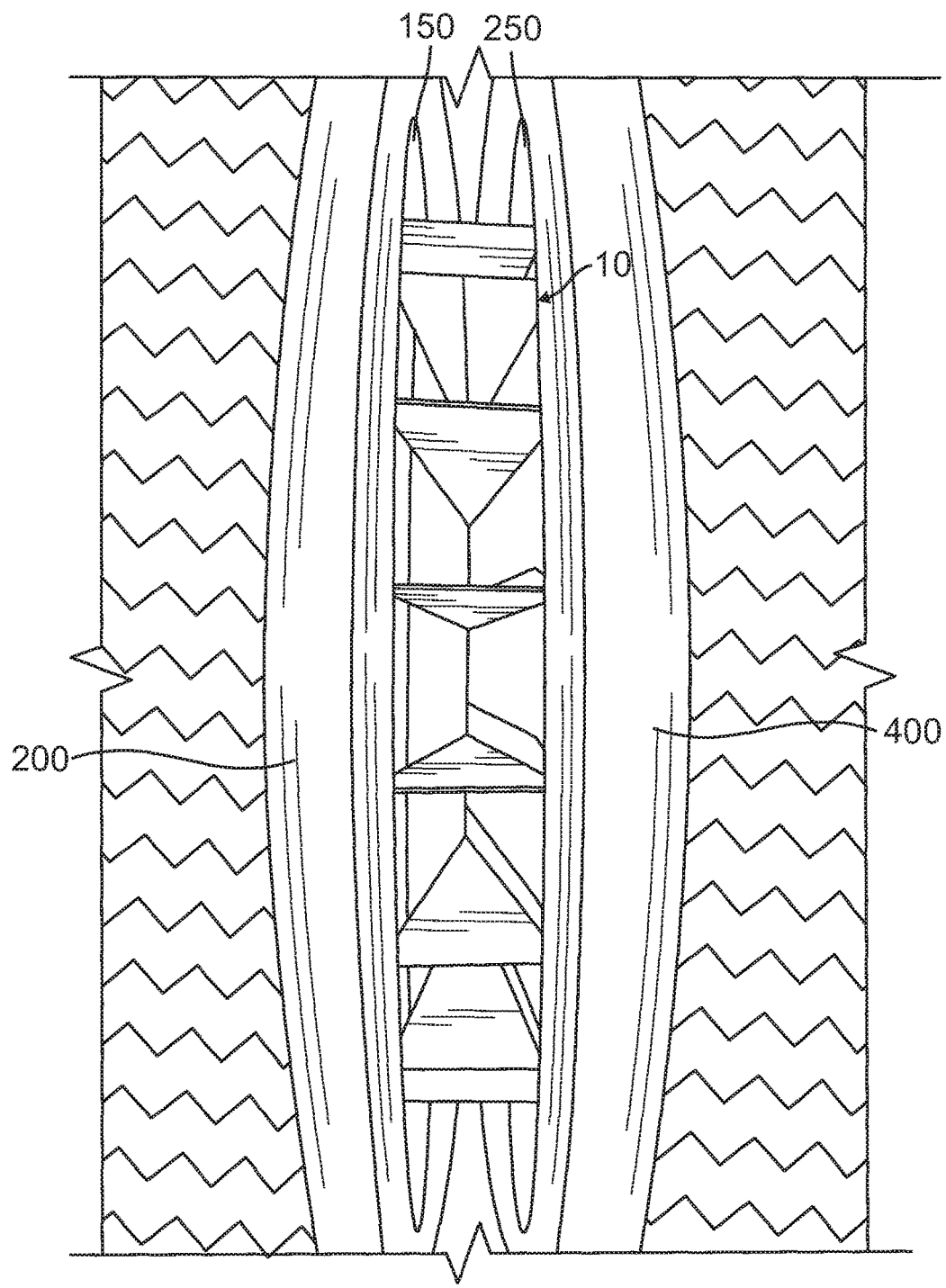
FIG. 6 is a side elevational perspective view of the present invention improved wheel mounted fan placed in an operative position shown mounted on the axle of a truck in between an inner tire and an outer tire.

It should be noted that the shape of each of the fan blades 80AA to 80TT including each length "L1" of first leg 164 and second leg 168 are each determined by the open cavity that is formed based on the opening that is formed between inner tire 200 and outer tire 400 (illustrated in FIG. 6). It is also within the spirt and scope of the present invention for wheel mounted cooling fan 10 to be able to fit in between two wheels on medium sized trucks and smaller sized trucks that have dual tires on each side of the axle. The geometries of the shape of the blades would be predominantly the same, only the overall size would be smaller to accommodate the smaller gap created by the smaller tires.

Figure 5:
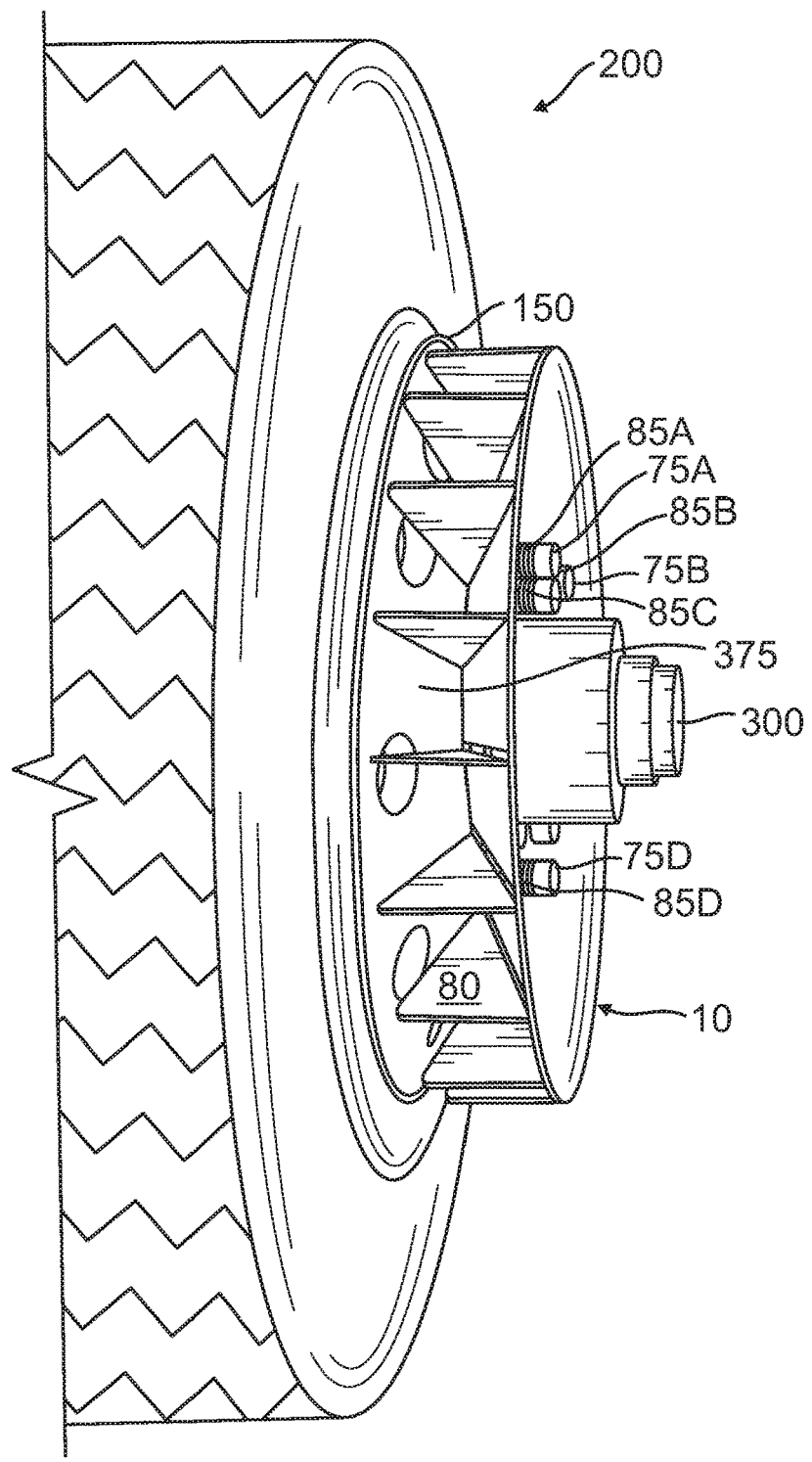
FIG. 5 is a side elevational perspective view of the present invention improved wheel mounted fan placed in an operative condition shown mounted on the axle of a truck to the right of an inner tire on an axle with the outer tire removed.

Referring to FIG. 5, there is illustrated a side perspective view of the present invention wheel mounted cooling fan 10 on the axle of a truck near hub 300 of the exterior side of an inner tire 200 on an axle with the outer tire removed. The rear angular surface 15R faces the inner tire 200 and the front angular surface 15F faces the outer tire. The blades 80AA to 80TT of the fan extend radially inward to adjacent the rim 150 of the inner tire 200. The overall size of the wheel mounted cooling fan 10 is sized to fit in between the truck tires on each of the axles containing two tires.

During movement of the truck and rotation of the truck tire, blades 80AA through 80TT will generate a stream of air that is directed towards the center of the hub 375 of wheel 2000. This stream of air as it passes through the hub performs the function of: 1) cooling brakes and hubs which reduce wear and tear; 2) reducing the temperature of a vehicle at a location underneath the vehicle that is 3) reducing aerodynamic drag and lowers air pressure under vehicle; 4) increasing fuel economy; and 5) reducing snow pack.

Referring to FIG. 5, the present invention wheel mounted cooling fan 10 is mounted on a truck axle near hub 300 to the right of an inner tire 200 on an axle with the outer tire 400 (illustrated in FIG. 6) removed. As illustrated in FIG. 5, wheel mounted cooling fan 10 is affixed to hub 300 by the use of studs such as 85A which respectively extend through a respective opening 70A and affixed through corresponding openings to tire rim 150 of inner tire 200 and aligned openings in tire rim 250 of outer tire 400. In the embodiment illustrated, there would be ten (10) studs corresponding to openings 70A through 70J In FIG. 5, only three (3) studs 85A, 85C and 85D are illustrated. Each stud is covered with a lug nut. In FIG. 5, lug nuts 75A, 75B, 75C and 75D. The openings 70A through 70J are radially interior to the fan blades and therefore do not interfere with the function of the fan blades 80AA to 80TT.

The shape of the fan blades as described in FIG. 4 and as discussed in FIGS. 1A, 1B, 2A. 2B, and 3 are illustrated in the operative condition in FIGS. 5 and 6.

Illustrated in FIG. 6 is a side elevational perspective view of the present invention improved wheel mounted cooling fan 10 shown mounted on the hub of a truck axle between an inner tire 200 and an outer tire 400. The circumferential outer edge 22 of wheel fan 10 is adjacent the tire rim 250 of outer tire 400. Also shown in FIG. 6 is how a portion of inner tire 200 and outer tire 400 overlap extending blades 80 when wheel mounted cooling fan 10 is mounted to the hub of a truck axle. The preferred material of construction for the present invention is glass filled nylon or a similarly known fiber reinforced plastic, however, other materials similar in strength and flexibility such as hard plastics, plastic composites, reinforced rubber or rubber composites, or metal composites could be a suitable material of construction for the present invention.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A wheel fan adapted for use between a respective tire rim of two adjacent tires of a truck including an inner tire and an outer tire, the wheel fan comprising:

a. a rear surface, a front surface, an outer rear circumferential section, an outer front circumferential section, a rear inner circumferential section, a front inner circumferential section, the outer rear circumferential section and the outer front circumferential section meet at an outer circumferential edge;

b. said rear inner circumferential section has a rear middle circumferential edge and a rear inner circumferential edge, a transition from the outer circumferential edge to connect with the rear middle circumferential edge occurs along a rear circumferential angled surface which transitions at an inward and downward angle from the outer circumferential edge to connect at the rear middle circumferential edge, collectively, a structure between the rear outer circumferential edge and the rear inner circumferential edge form a rear circumferential base of the wheel fan with the rear circumferential base having a central opening;

c. said front inner circumferential section has a front middle circumferential edge and a front inner circumferential edge, a transition from the outer circumferential edge to connect with front middle circumferential edge occurs along a front circumferential angled surface which transitions at an inward and downward angle from the outer circumferential edge to connect at front middle circumferential edge, collectively, a structure between the front outer circumferential edge and front inner circumferential edge form a front circumferential base of the wheel fan with the front circumferential base having a central opening aligned with the central opening of the rear circumferential base;

d. located between the front circumferential angled surface and the rear circumferential angled surface are two oppositely disposed valve openings to respectively accommodate a valve from the inner tire and a valve from the outer tire;

e. a multiplicity of mounting holes extending through the front circumferential base and through the rear circumferential base; and f. a multiplicity of fan blades formed into and extending radially from said rear circumferential angled surface, each of the multiplicity of fan blades in the shape of an isosceles triangle with a first leg of the isosceles triangle integrally formed with the rear circumferential angled surface, and extending from a first end adjacent the outer circumferential edge to a first distal end adjacent the rear middle circumferential edge, an isosceles triangle base extending from a bottom end at the outer circumferential edge and at the first end of the first leg of the isosceles triangle to a second distal end and a second leg of the isosceles triangle extending from the distal end of the first leg of the isosceles triangle to the second distal end of the isosceles triangle base;

g. wherein the wheel fan is positioned on the an axle of the truck between the inner tire and the outer tire, the rear circumferential angled surface faces the inner tire and the front circumferential angled surface faces the outer tire, the multiplicity of fan blades extend radially inward to adjacent a rim of the inner tire and studs extend through the mounting holes and the mounted wheel fan is affixed to the rim of the inner tire and a rim of the outer tire;

h. whereby, during movement of the truck and rotation of the inner truck tire and movement of the outer truck tire, the multiplicity of fan blades generate a stream of air that is directed towards a center of the a hub of the inner tire and the steam stream of air as it passes through the hub performs the function of 1) cooling brakes and hubs which reduce wear and tear, 2) reducing under vehicle temperature, 3) reducing aerodynamic drag and lowering air pressure under a vehicle riding on the tires, 4) increasing fuel economy and 5) reducing snow pack.

2. The wheel fan in accordance with claim 1, further comprising: said multiplicity of fan blades having a range between 10 fan blades and 30 fan blades.

3. The wheel fan in accordance with claim 1, further comprising: said wheel fan is made of material+selected from the group consisting of glass filled nylon, fibre reinforced plastics, hard plastics, plastic composites, reinforced rubber, rubber composites, or metal composites.

4. The wheel fan in accordance with claim 1, further comprising: each individual isosceles triangle fan blade has a distance from said rear middle circumferential edge to said rear outer circumferential edge that is greater than a distance at the outer circumferential edge between adjacent isosceles triangle fan blades.

5. A wheel fan adapted for use between a respective tire rim of two adjacent tires including an inner tire and an outer tire of a vehicle, the wheel fan, comprising:

a. a rear surface, a front surface, an outer rear circumferential section, an outer front circumferential section, a rear inner circumferential section, and a front inner circumferential section, the outer rear circumferential section and the outer front circumferential section meet at an outer circumferential edge;

b. said rear inner circumferential section has a rear middle circumferential edge and a rear inner circumferential edge, a transition from the outer circumferential edge to connect with the rear middle circumferential edge occurs along a rear circumferential angled surface which transitions at an inward and downward angle from the outer circumferential edge to connect at rear middle circumferential edge, collectively, a structure between the rear outer circumferential edge and the rear inner circumferential edge form a rear circumferential base of the wheel fan with the rear circumferential base having a central opening;

c. said front inner circumferential section has a front middle circumferential edge and a front inner circumferential edge, a transition from the front outer circumferential edge to connect with front middle circumferential edge occurs along a front circumferential angled surface which transitions at an inward and downward angle from the outer circumferential edge to connect at front middle circumferential edge, collectively, a structure between the front outer circumferential edge and front inner circumferential edge form a front circumferential base of the wheel fan with the front circumferential base having a central opening aligned with the central opening of the rear circumferential base;

d. a multiplicity of mounting holes extending through the front circumferential base and through the rear circumferential base; and e. a multiplicity of fan blades formed into and extending radially from the outer circumferential surface, each of the multiplicity of fan blades in the shape of a triangle with a first leg of the s triangle integrally formed with the rear circumferential angled surface;

f. wherein the wheel fan is positioned through an axle of a truck near a hub between an aligned inner tire and an aligned outer tire, the rear angular surface faces the inner tire and the front angular surface faces the outer tire, the multiplicity of fan blades extend radially inward to adjacent a rim of the inner tire and the outer circumferential edge is adjacent a rim of the aligned outer tire.

6. The wheel fan in accordance with claim 5, further comprising: located between the front circumferential angled surface and the rear circumferential angled surface are two oppositely disposed valve openings to respectively accommodate a valve from the inner tire and a valve from the outer tire.

7. The wheel fan in accordance with claim 5, further comprising: said multiplicity of fan blades having a range between 10 blades and 30 blades.

8. The wheel fan in accordance with claim 5, further comprising: said wheel fan is made of material selected from the group consisting of glass filled nylon, fibre reinforced plastics, hard plastics, plastic composites, reinforced rubber, rubber composites, or metal composites.

9. The wheel fan in accordance with claim 5, further comprising: each individual triangle fan blade has a distance from a rear outer circumferential edge to said rear middle circumferential edge that is greater than a distance at the outer circumferential edge between adjacent fan blades in the shape of a triangle.

10. A wheel fan adapted for use between a respective tire rim of two adjacent tires of a, vehicle, the wheel fan, comprising:

a. a rear surface, a front surface, an outer rear circumferential section, an outer front circumferential section, a rear inner circumferential section, and a front inner circumferential section, the outer rear circumferential section and the outer front circumferential section meet at an outer circumferential edge;

b. the rear inner circumferential section has a rear middle circumferential edge and a rear inner circumferential edge, a transition from outer circumferential edge to connect with rear middle circumferential edge occurs along a rear circumferential angled surface which transitions at an inward and downward angle from the outer circumferential edge to connect at said rear middle circumferential edge, collectively, a structure between the rear outer circumferential edge and the rear inner circumferential edge form a rear circumferential base of the wheel fan with the rear circumferential base having a central opening;

c. said front inner circumferential section has a front middle circumferential edge and a front inner circumferential edge, a transition from the outer circumferential edge to connect with front middle circumferential edge occurs along a front circumferential angled surface which transitions at an inward and downward angle from the outer circumferential edge to connect at front middle circumferential edge, collectively, a structure between the front outer circumferential edge and the front inner circumferential edge form a front circumferential base of the wheel fan with the front circumferential base having a central opening aligned with the central opening of the rear circumferential base;

d. a multiplicity of mounting holes extending through the front circumferential base and through the rear circumferential base; and e. a multiplicity of equally spaced apart fan blades formed into and extending radially from the rear circumferential angled surface, each of the multiplicity of fan blades with a portion of each fan blade integrally formed with the rear circumferential angled surface.

11. The wheel fan in accordance with claim 10, further comprising: located between the front circumferential angled surface and the rear circumferential angled surface are two oppositely disposed valve openings to respectively accommodate a valve from the inner tire and a valve from the outer tire.

12. The wheel fan in accordance with claim 10, further comprising: said multiplicity of fan blades having a range between 10 blades and 30 blades.

13. The wheel fan in accordance with claim 10, further comprising: said wheel fan is made of material selected from the group consisting of glass filled nylon, fibre reinforced plastics, hard plastics, plastic composites, reinforced rubber, rubber composites, or metal composites.

* * * * *